United States Patent [19]

Nakamura et al.

[11] 4,088,213
[45] May 9, 1978

[54] APPARATUS FOR TRANSPORTING CYLINDRICAL STEEL ARTICLES

[75] Inventors: Takahiro Nakamura; Yoriyuki Inoue; Tatsuo Yanagiuchi; Kazuo Houji; Takashi Yamaguchi; Wataru Furukawa, all of Wakayama; Susumu Itoh, Hitachi; Tadashi Kanaya, Hitachi; Tuneo Ichiishi, Hitachi; Akira Osaka, Hitachi, all of Japan

[73] Assignees: Hitachi, Ltd.; Sumitomo Metal Industries, Ltd., both of Japan

[21] Appl. No.: 688,571

[22] Filed: May 21, 1976

[30] Foreign Application Priority Data

May 23, 1975 Japan ................... 50-61052
May 23, 1975 Japan ................... 50-61053

[51] Int. Cl.² .............................................. B65G 11/20
[52] U.S. Cl. ...................................... 193/40; 188/164; 310/12; 318/135
[58] Field of Search ................... 193/38, 39, 40, 41, 193/32; 188/164, 165, 267; 198/690, 691, 619, 805; 310/12; 318/135

[56] References Cited

U.S. PATENT DOCUMENTS

| 1,727,163 | 9/1929 | Fehringer et al. | 188/164 X |
| 1,905,218 | 4/1933 | Crago | 188/164 |
| 3,263,796 | 8/1966 | Parke | 310/12 X |
| 3,675,757 | 7/1972 | Yabuta | 198/619 |
| 3,695,408 | 10/1972 | Bruno | 193/40 |
| 3,873,014 | 3/1975 | Matsuhisa | 310/12 X |
| 3,882,981 | 5/1975 | Izumidate et al. | 193/40 |

*Primary Examiner*—Evon C. Blunk
*Assistant Examiner*—James L. Rowland
*Attorney, Agent, or Firm*—Craig & Antonelli

[57] ABSTRACT

In an apparatus for transporting cylindrical steel articles by rolling down on inclined skid rails, a plurality of electromagnets are provided along extension of the skid rails so as to reduce the speed of rolling down of the articles repeatedly during transportation on the skid rails by applying forward and reverse excitations to each of the electromagnets at a predetermined timing thereby to transport the articles in a pitch transfer mode.

11 Claims, 40 Drawing Figures

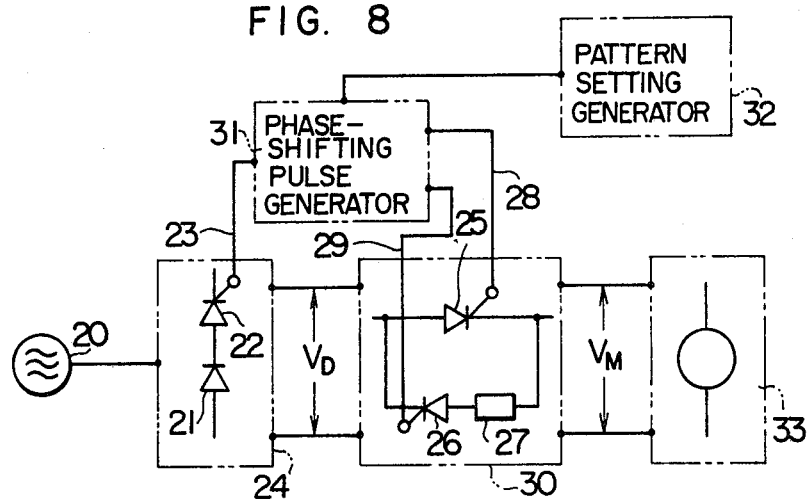
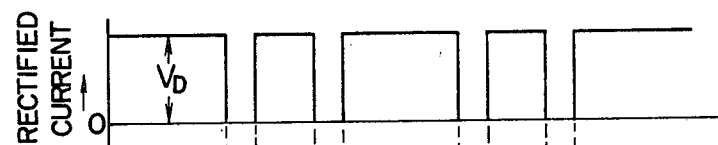
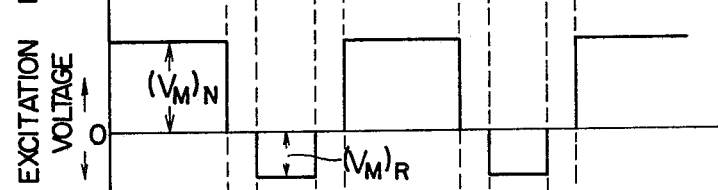
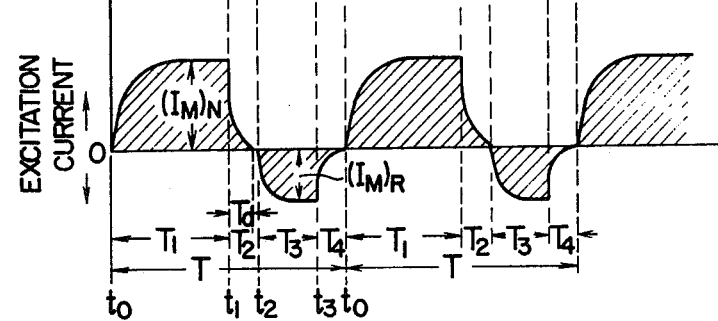

APPARATUS FOR TRANSPORTING CYLINDRICAL STEEL ARTICLES

The present invention relates to an apparatus for transporting cylindrical steel articles, such as steel pipes, rods or the like and more particularly to an apparatus of the kind adapted to suppress noises produced due to collision between steel pipes or the like when they are transported.

A transporting apparatus such as a roller conveyor is used with a steel pipe production line in a steel plant, to transport or convey produced steel pipes. A skid for providing a temporary storage of the steel pipes at a predetermined position may be provided between production lines so as to make it possible to couple the lines to each other and check the steel pipes. The skid is usually inclined to ease the transportation of the steel pipe from one line to another with the aid of gravity. The successive transportation of the steel pipes, however, causes a steel pipe stored on the skid to collide with another steel pipe conveyed from the line with the result of the generation of great noises. In a short skid, on the other hand, the inclination of the skid is made small. In this case, the steel pipes also collide with each other similarly with noise being generated. The noise sometimes produces a source of nuisance, particularly in a steel plant operated continuously both day and night, because the noise produced by the steel pipes is generally so great as to to be heard at a long distance. Further, strong demands are made to provide a method or device for suppressing the noise in a steel plant producing the above-mentioned noise in view of the fact that noise regulations are put into effect according to noise nuisance regulation law or for the improvement in working environments.

In order to satisfy these demands, a proposal has been made in which the skid for transporting steel pipes is provided with means for electromagnetically or mechanically restricting the speed of transportation of the steel pipe thereby to suppress the noise generated. One of such an apparatus is disclosed in U.S. Pat. No. 3,882,981, entitled "Silencing Means for Steel Pipe Production Lines" granted on patent application Ser. No. 253,756 filed May 16, 1972. However, no satisfactory solution has as yet been achieved on the problem of how the restricting means should be controlled to obtain an optimum effect thereof.

An object of the present invention is to provide an apparatus for transporting cylindrical steel articles such as steel pipes, rods or the like which is capable of obtaining an optimum effect in restricting the noise derived from transportation of the same even when the articles are those having large weight such as steel pipes or rods of large diameter.

Another object of the present invention is to provide an apparatus for transporting cylindrical steel pipes, rods or the like which is capable of transporting the articles at regular intervals irrespective of their diameter thickness or length and controlling the transportation speed thereby to reduce the noises generated by collision between the articles.

An apparatus according to the present invention is provided to comprise transporting means including a plurality of skid rails extending from an entrance end to an exit end of the transporting means in parallel with and spaced from each other and inclined from the entrance end to the exit end for transporting a steel article, means for providing a magnetic circuit passing through at least a part of the steel article being transported, exciting means for producing magnetic flux through the magnetic circuit and control means for applying to the exciting means forward and reverse excitations alternately with a predetermined relationship in timing.

The above and other objects, features and advantages of the present invention will be apparent from the following description in conjunction with the accompanying drawings in which:

FIG. 8 is a block diagram showing a circuit according to one embodiment of the present invention;

FIGS. 9a, 9b and 9c are graphs illustrating the operation of the controlling device;

Figure 12:
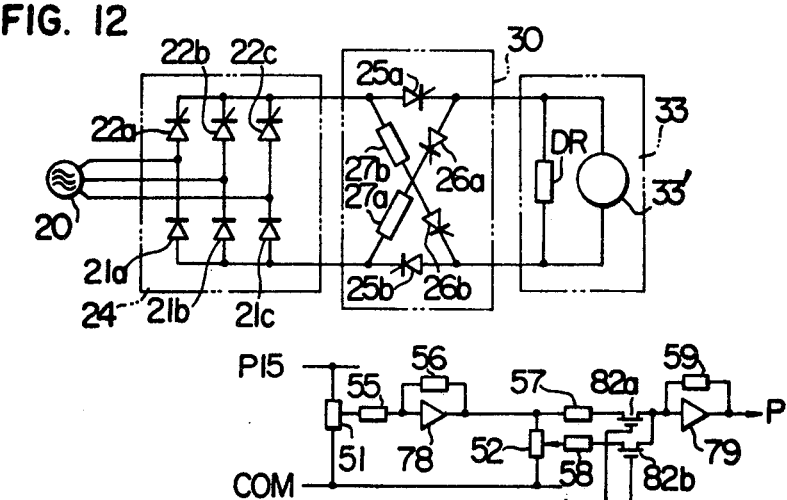
Figure 13:
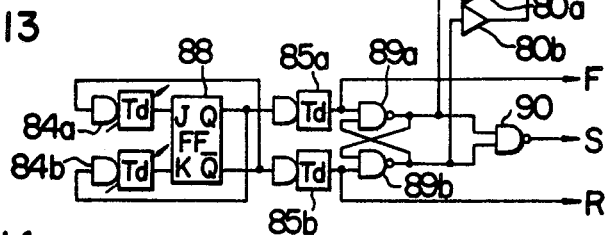
Figure 14:
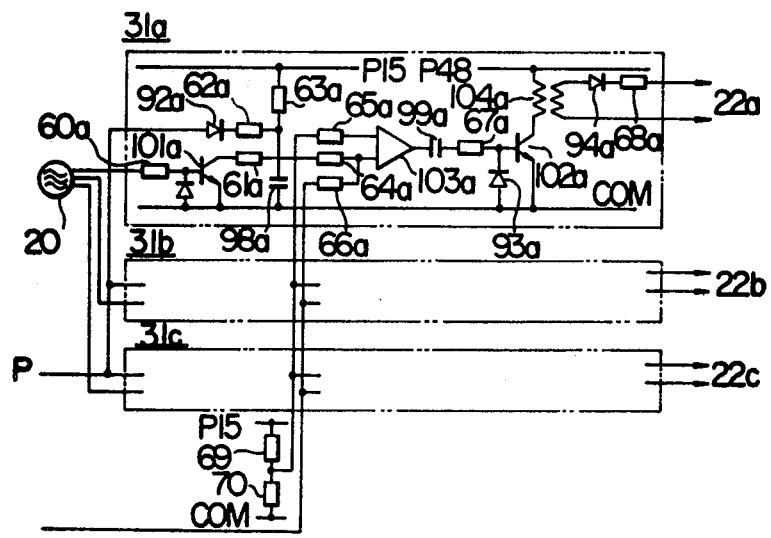
Figure 15:
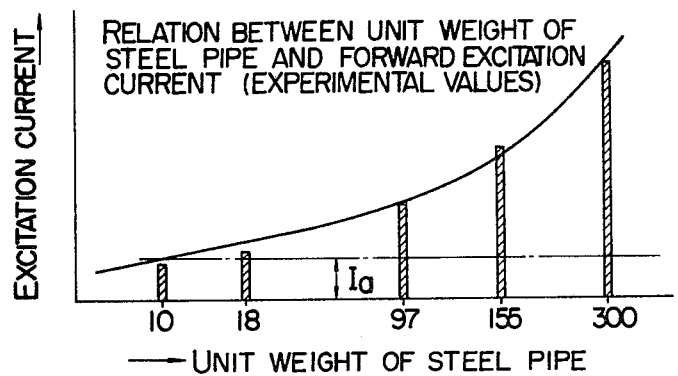
Figure 16:
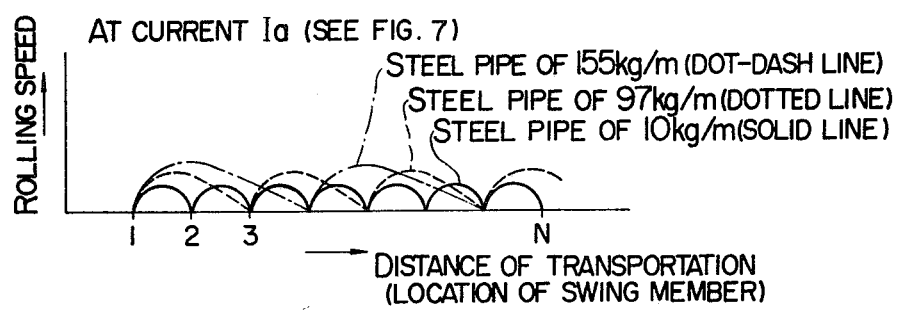
Figure 17A:
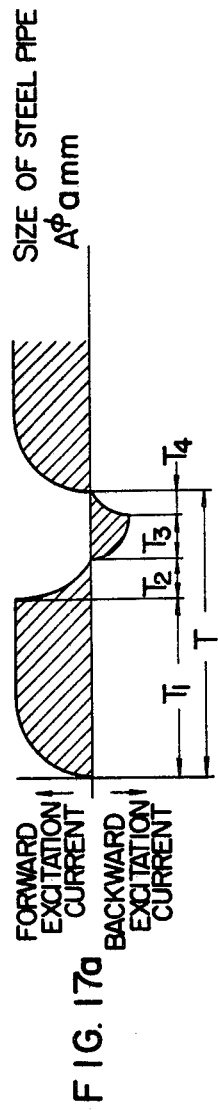
Figure 17B:
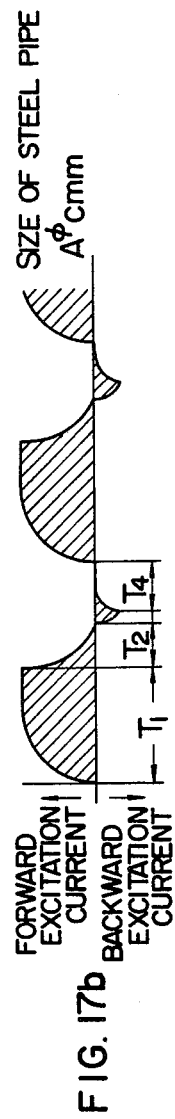
Figure 17C:
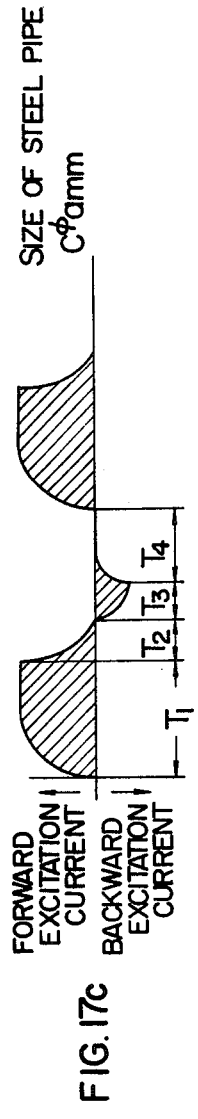
Figure 17D:
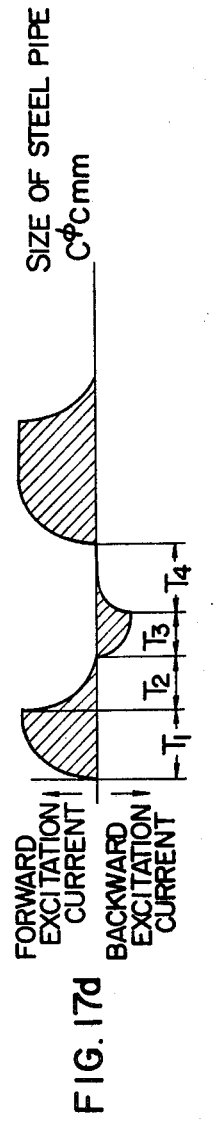
Figure 18:
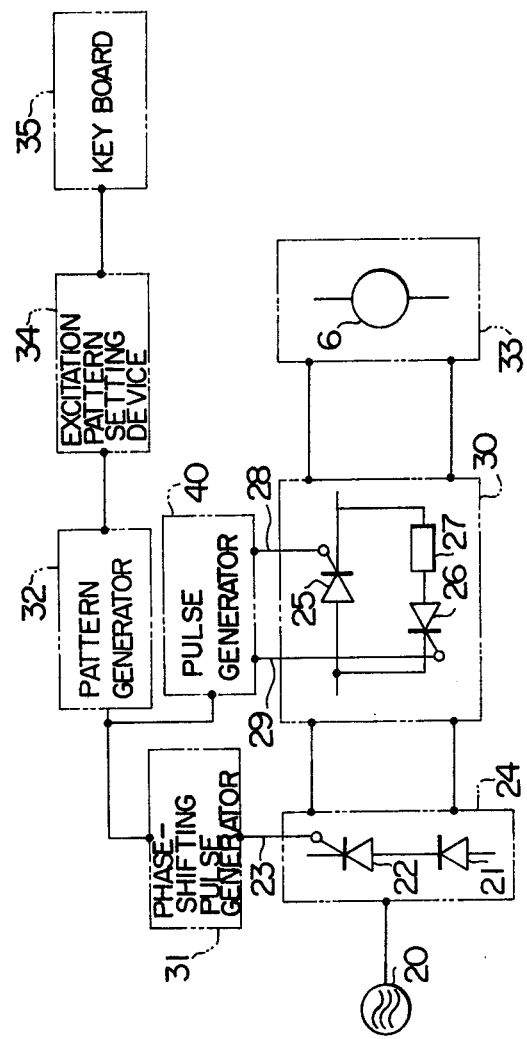
Figure 19:
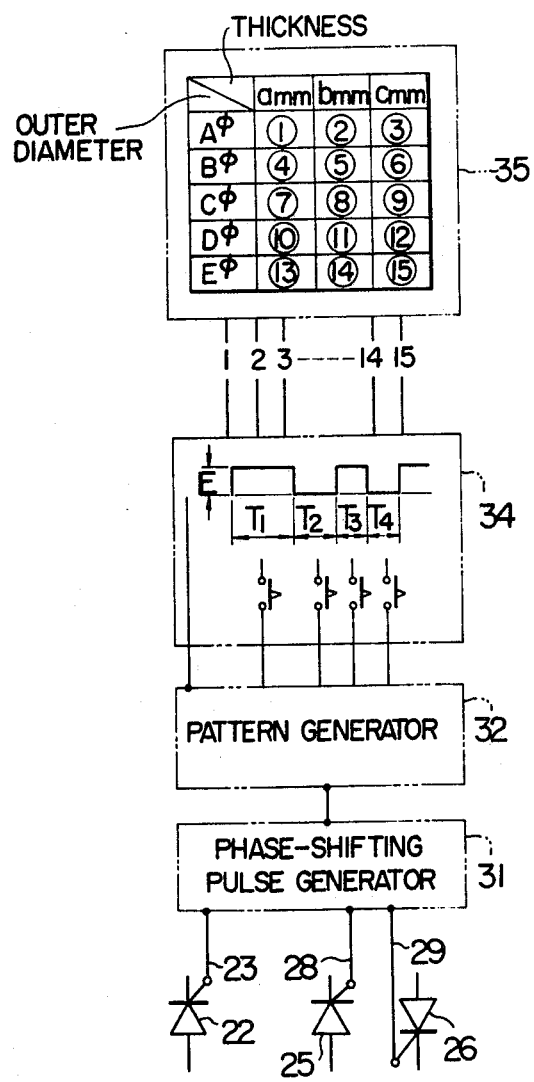
Figure 20:
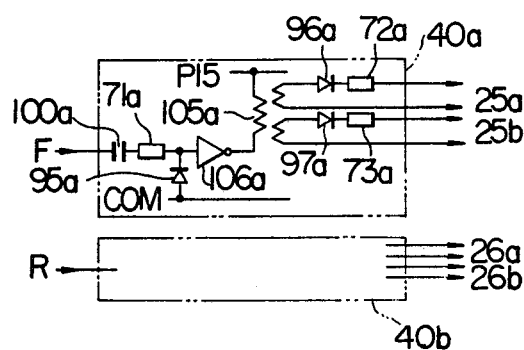
Figure 21:
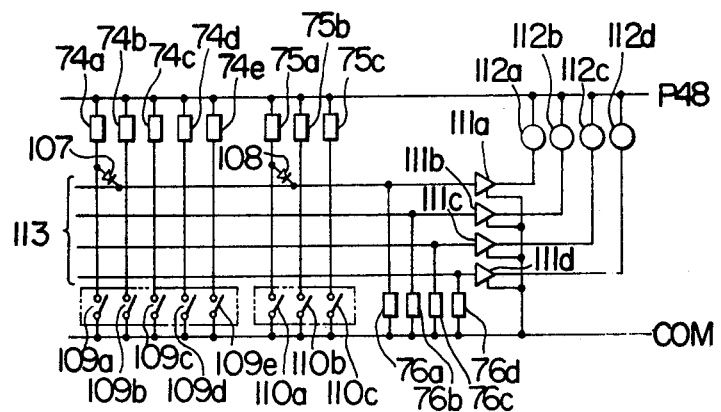

FIG. 12 shows a circuit diagram of the DC power source device 24, the switch device 30 and the exciting device 33 as shown in FIG. 8;

FIG. 13 shows a circuit diagram of the portion setting generator 32 in FIG. 8;

FIG. 14 shows a circuit diagram of the phase-shifting pulse generator 31 in FIG. 8;

FIG. 15 is a graph showing the weight of the article to be conveyed and its optimum forward excitation current;

FIG. 16 is a graph showing a relation between the distance from the entrance end of the conveyor and the speed of article when conveyed thereon which varies depending on the size of the article;

FIGS. 17a to 17d are graphs each showing optimum excitation patterns in accordace with the size of the articles to be conveyed;

FIGS. 18 and 19 are views showing a circuit according to another embodiment of the present invention;

FIG. 20 shows a circuit diagram of the pulse generator 40 in FIG. 18;

FIG. 21 shows a circuit diagram of the key board in FIG. 18; and

Figure 22:
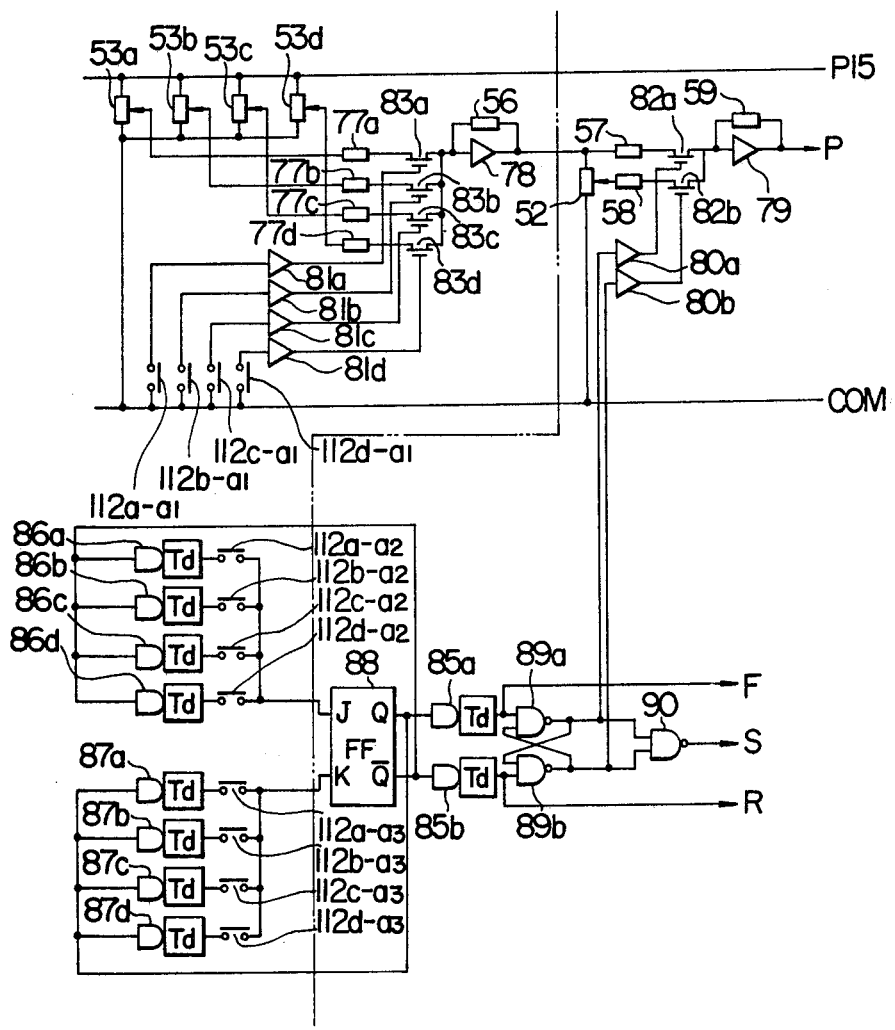

FIG. 22 shows a circuit diagram of the pattern generator 32 and the excitation pattern setting device 34 in FIG. 18.

Figure 1A:
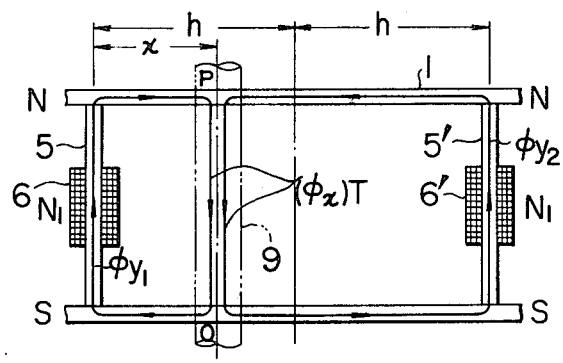
FIGS. 1a, 1b and 1c are views for illustrating the principle of the present invention.
Figure 1B:
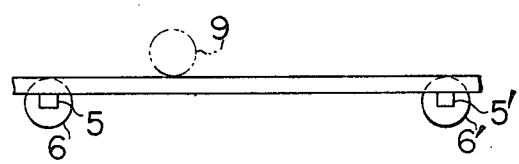

First, the principle of the present invention will be described with reference to FIGS. 1a to 1c. As shown in FIG. 1a, two skid rails 1, 1' having a length of 2h are short-circuited at both their ends by iron cores 5, 5', which are provided with excitation coils 6, 6'. It is assumed that the two excitation coils are equally excited so that one of the rails 1 may form an N pole and the other 1' an S pole. FIG. 1b is a side view of FIG. 1a. When a steel pipe 9 is on points P and Q a distance X spaced away from the end of one magnet yoke (iron core 5), a magnetic flux flowing into the steel pipe by means of the excitation coil 6 is generally approximately given by the following expression, $$\phi y_1 = a e^{-bx} \quad (1)$$

where $a$ and $b$ are a constant depending upon a magnetic path.

A magnetic flux $\phi y_2$ flowing into the steel pipe by means of the other excitation coil 6' is expressed as follows:

$$\phi y_2 = a e^{-b(2h-x)} \quad (2)$$

The resultant magnetic flux $(\phi x)_T$ in the steel pipe at the point $x$ is $$(\phi x)_T = \phi y_1 + \phi y_2 = a e^{-bx}\{1 + e^{2b(x-h)}\} \quad (3)$$

Figure 1C:
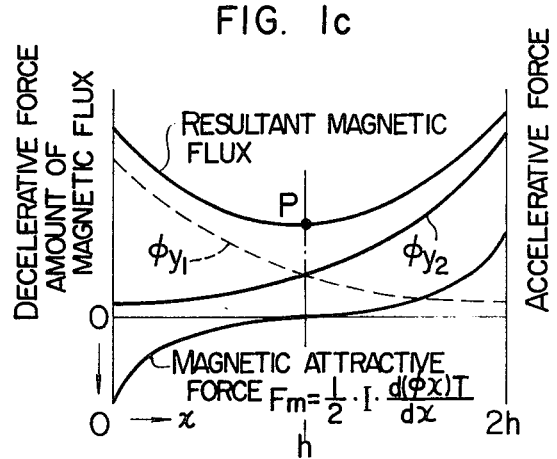

The expression (3) is shown in FIG. 1c. The resultant magnetic flux $(\phi x)_T$ is approximately inversely proportional to the square of the distance $x$ between the excitation coil and the steel pipe in $0 < x < h$, and approximately proportional to the square of $x$ in $h < x < 2h$, thus having a point of inflection at a point $x = h$. In other words, the resultant magnetic flux $(\phi x)_T$ varies according to the displacement of the steel pipe up to $0 < x < 2h$ with the result of positional variation of magnetic energy exerted on the steel pipe. In this case, a magnetic attractive force Fm is exerted in a direction opposite to the direction of displacement, and the following expression is provided on the assumption of a constant value I of excitation current to the magnet, $$Fm = \frac{1}{2} \cdot I \cdot \frac{d(\phi x)_T}{dx} = \frac{1}{2} I \cdot abe^{-bx} \cdot \{1 - e^{2b(x-h)}\} \quad (4)$$

The illustration of the expression (4) shows that, as shown by a curve Fm in FIG. 1c, a deceleration is exerted on the steel pipe, as it moves away from the magnet 6, it exists in $0 < x < h$, that is, nearer to the magnet 6, because the magnetic attractive force due to the magnet 6 is greater than that due to the magnet 6', and an acceleration is exerted thereon if it exists in $h < x < 2h$ and comes nearer to the magnet 6'. The magnetic attractive force is, therefore, exerted on the steel pipe deceleratively and then acceleratively. The expression (4) is non-linear, but approximated to a linear expression, $$Fm \approx \frac{I \cdot a \cdot b}{2h} (1 - e^{2bh}) (x - h) \quad (5)$$

if the distance $2h$ between the excitation coils is made small with the same excitation.

Figure 2:
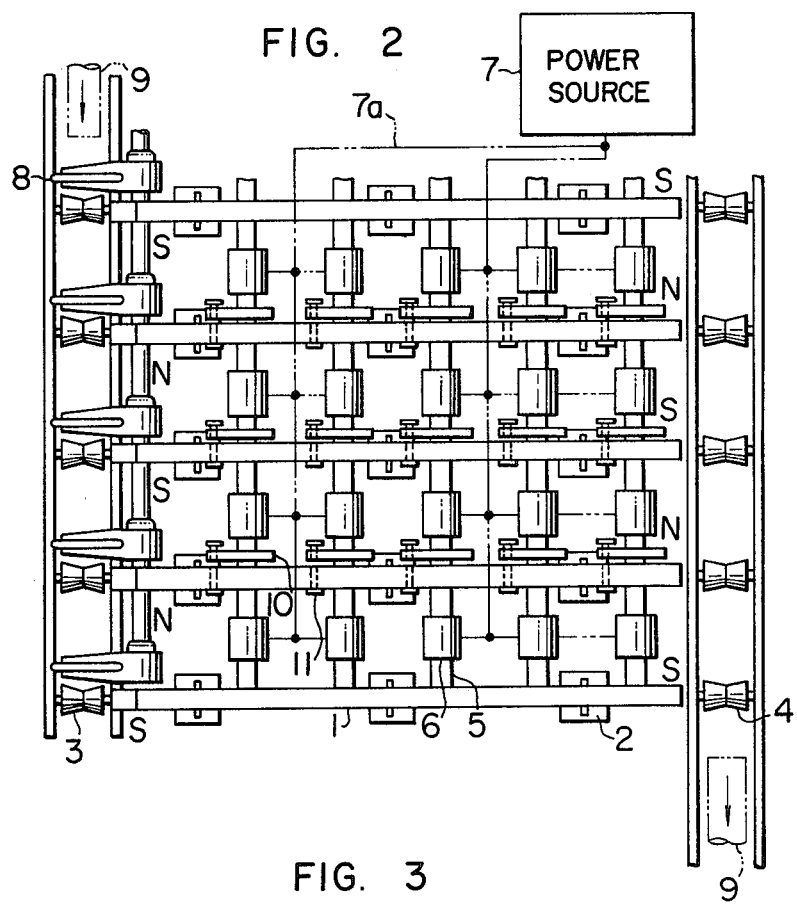
FIG. 2 is a plan view showing the structure of the mechanical part of the apparatus of the present invention.
Figure 3:
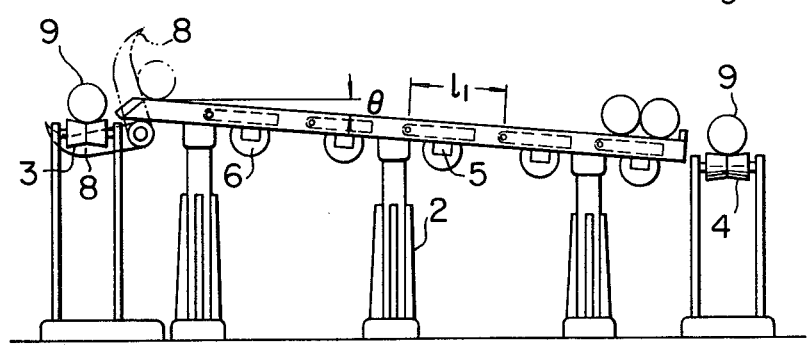
FIG. 3 is a side view of the apparatus in FIG. 2.

The description has above been made on the assumption of horizontal skid rails, but the skid rails are actually inclined from one end to the other, so that the steel pipe rolls down along the surface of inclination depending upon its grade. The rolling steel pipe has its speed braked deceleratively with the aid of the above-mentioned electromagnetical energy, but the braking force is still insufficient. To solve this problem, a swing device is further provided as shown in FIGS. 2 and 3. The swinging device includes a plurality of swing members each made of a magnetic material, extending along the direction of transportation of the steel pipe, and pivotably supported at its one end. The swing member is usually located such that its upper surface is at the same level as, or slightly lower than the inclined surfaces of the skid rails on which the steel pipes are transported. The swing member is magnetized when the magnet coil is excited. When a steel pipe rolls down on the inclined surface of the skid, and the swing member is magnetized, the swing member is attracted to the steel pipe and caused to swing upwards about the supporting axis so that the other end thereof projects above the skid surface. Thus, the steel pipe contacts with the swing member, as well as the skid surface, resulting in more deceleration due to mechanical and electromagnetic forces including the braking force of eddy current effects exerted between the magnetized rails and the steel pipe. As the steel pipe goes down, the swing member swings downwards, while it is still attracted by the steel pipe thereby to be held in contact with the same. When the steel pipe moves from the swing member, the magnetic attractive force exerted between the steel pipe and the swing member acts in a direction opposite to the direction of the movement of the steel pipe thereby to reduce the speed of the transportation of the same. The operation of the swing member during this step will further be described in detail.

Figure 4A:
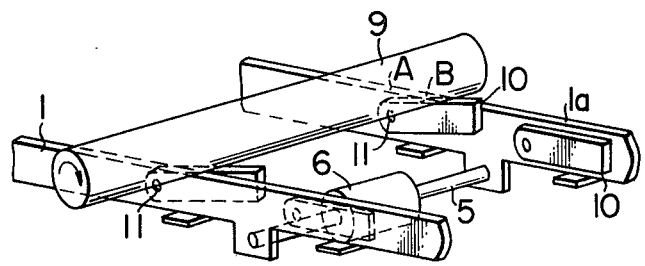
FIGS. 4a, 4b, 4c and 4d are views showing the operation of a swing member in an embodiment of the present invention.
Figure 5A:
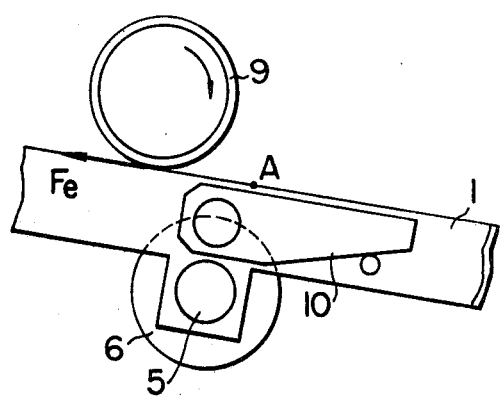
FIGS. 5a, 5b and 5c are views showing the displacement of the swing member in accordance with the positional variation of steel pipes to be conveyed.

When, in FIG. 4a, the steel pipe 9 rolls down on the inclined surface of the skid rail 1, current is caused to flow into the excitation coil 6 by a power supply in FIG. 2 to provide a magnetic path from the excitation coil 6 through iron core 5 and skid rail 1 to steel pipe 9 and form a magnetic loop. At this time, a magnetic attractive force is produced to decelerate the steel pipe 9, which is simultaneously accelerated by the inclined surface and thus controlled with repeated acceleration and deceleration. At this time, the magnetic flux at a contacting point of the steel pipe 9 and the skid rail 1 is distorted by the rotation of the steel pipe, so that eddy current flows inside the steel pipe to exert a braking force Fe due to the eddy current effect upon the steel pipe 9 with the result of gradual deceleration of the steel pipe. This state is shown in FIG. 5a.

Figure 4B:
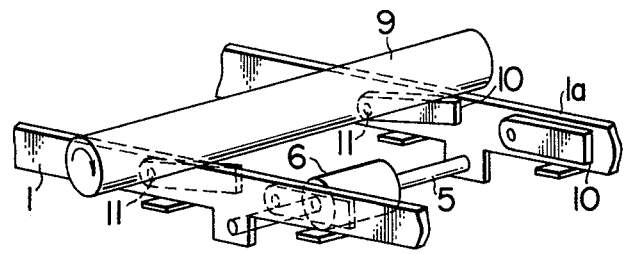
Figure 4C:
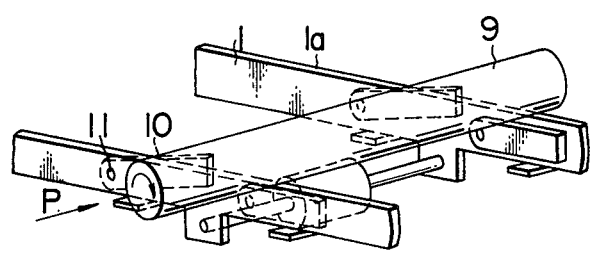
Figure 4D:
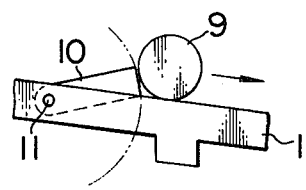
Figure 5B:
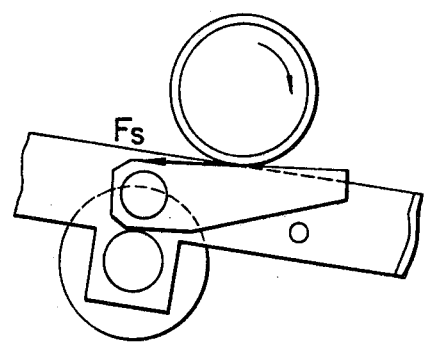
Figure 5C:
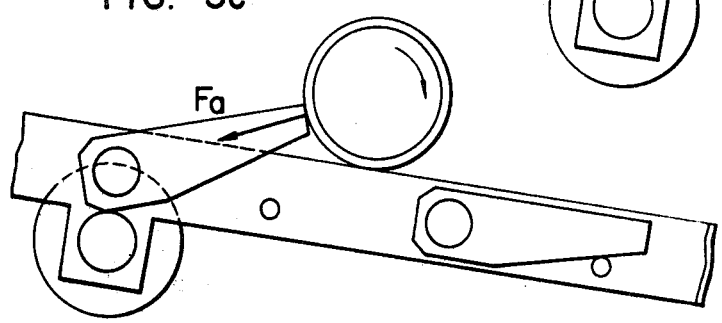

When the steel pipe 9 next rolls on the inclined surface 1a clockwise as shown in FIG. 4a and comes near to the swing member 10, which is excited by the excitation coil 6, the swing member 10 attracts the steel pipe rolling down on the inclined surface to such an extent that it stops the steel pipe. Simultaneously, the steel pipe comes into contact with the skid rail at a point A (on the rail 1) and with the swing member 10 at a point B with its contacting area expanded. The magnetic attractive force is, therefore, made strong with the steel pipe decelerated. In this case, a rolling friction appears at the point A and a sliding friction at the point B, so that these provide a great braking effect to the rolling article. This condition, in which a mechanical frictional force is exerted, is shown in FIG. 5b. When the steel pipe rides on the swing member 10, the latter sinks under the inclined surface 1a as shown in FIG. 4b. When the steel pipe further passes through the swing member, the latter is moved above the inclined surface together with the steel pipe as shown in FIG. 4c as the steel pipe rolls down. At the instant when both are removed from each other, a great magnetic attractive force is produced. This state is shown in FIG. 5c.

A relative movement between the above steel pipe and the swing member will be described in more detail in conjunction with FIGS. 6a to 6d. It is considered that a plurality of swing devices 10 are provided along the skid rail 1. Assuming that l1 is an interval at which the swing devices 10 are mounted, M the mass of the steel pipe, g the acceleration due to gravity and 0-74 the grade of the skid rail 1, the accelerating energy $E_{Pl}$ due to the gravity per swing magnetic pole stage is expressed by $$E_{Pl} = l1 \cdot Mg \cdot \sin\theta \qquad (6)$$

Figure 6A:
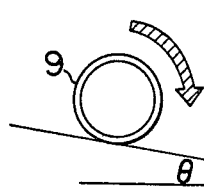
FIGS. 6a, 6b, 6c and 6d are views showing a relation between the position of the conveyed steel pipe and damping energy exerted thereon.
Figure 6B:
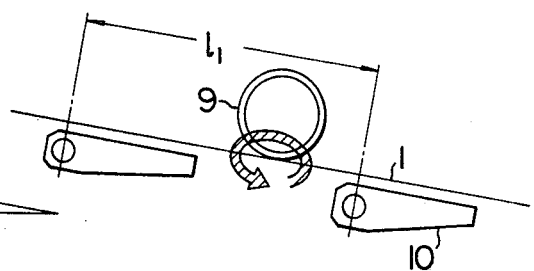

(see FIG. 6a). When, on the other hand, the steel pipe 9 does not contact with the swing member 10, that is, when the steel pipe 9 is on the skid rails 1, the braking force due to eddy current is exerted thereon as mentioned above. A braking energy $E_{el}$ due to the eddy current obtained from one of the swing members 10 to another is expressed by $$E_{el} = \int_0^{l_1} q \cdot B_p{}^2 \cdot v \, dx \qquad (7)$$

on the assumption of the rolling speed $v$ of the steel pipe 9, the magnetic flux density $B_p$ at a contact point of the steel pipe 9 and the skid rail 1 and constant $q$ determined by the magnetic circuit (see FIG. 6b). Assuming next that $s$ is a distance along which the steel pipe 9 rolls over the swing member 10, $Fa$ the magnetic attractive force and $\mu$ a friction factor, a braking energy $E_{sl}$ due to a mechanical friction for one stage of swing device is expressed by $$E_{sl} = \mu \cdot Fa \cdot S \qquad (8)$$

Figure 6C:
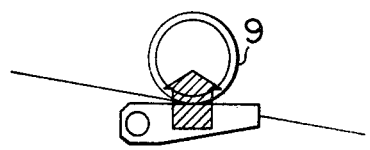

(see FIG. 6c). When the pipe 9 moves further from the swing member 10 with its equivalent gap variation of $\delta_1$ to $\delta_2$, a braking energy $E_{al}$ due to a magnetic attractive force for one stage of swing device is given by $$E_{al} = \int_{\delta_1}^{\delta_2} Fa \, dx \qquad (9)$$

Figure 6D:
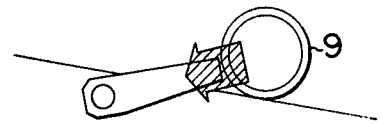

(see FIG. 6d).

Therefore, a kinetic energy $En$ of the steel pipe obtained when an $n$-stage of swing devices are provided is expressed by an equilibrium, $$En = Eo + n(E_{Pl} - E_{el} - E_{sl} - E_{al}) \qquad (10)$$

where $Eo(= \frac{1}{2} Mv_o{}^2)$ is an initial energy with an initial velocity $v_o$.

In the present invention, assuming that the initial energy due to the initial velocity is made zero in the equilibrium given by the expression (10), the accelerating energy due to the free fall of the steel pipe is made to be in equilibrium with the total braking energy which is the sum of the above mentioned three braking energies, or to satisfy the following expression:

$$E_{Pl} \leq E_{el} + E_{sl} + E_{al} \qquad (11)$$

This causes the steel pipe to be stopped or reduced in velocity to about zero for every stage of the swing device and to be conveyed in pitches for every pitch between the swing devices 10, thus controlling the noises generated by collision of the steel pipes with each other so that they may be reduced remarkably.

Figure 7:
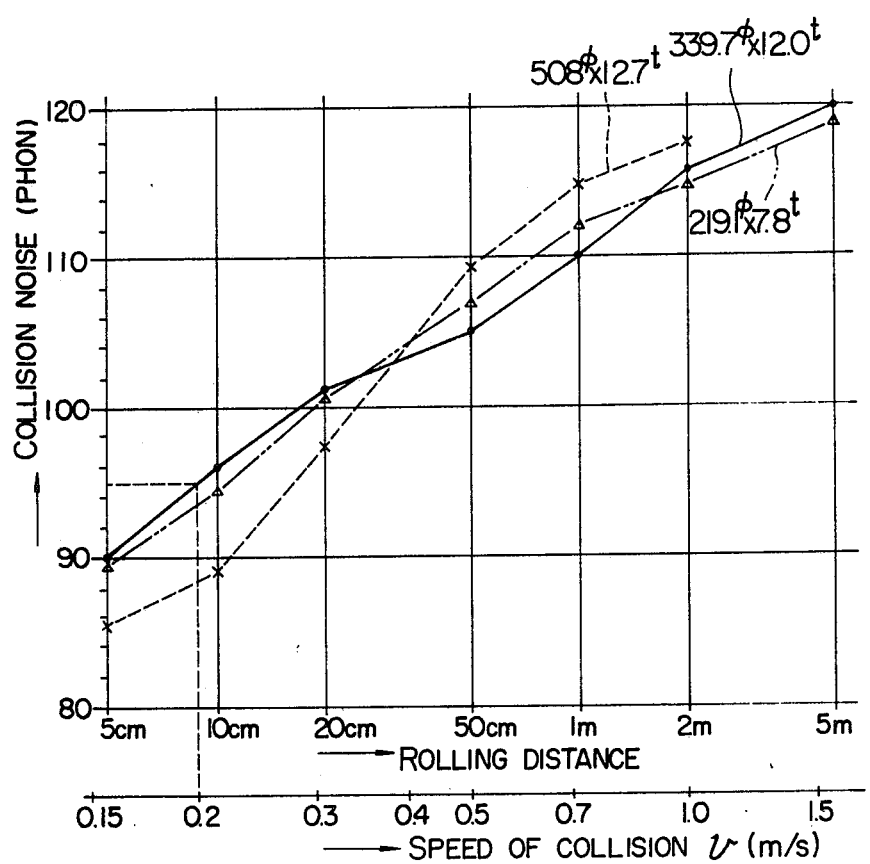
FIG. 7 is a diagram showing a relation between the rolling speed of the steel pipe and the collision noise thereof.

Experimental results reveal that relations as shown in FIG. 7 are obtained between the fall distance or rolling speed and the noise of collision of three kinds of steel pipes each having an outer diameter of 508 mm, 339.7 mm and 219.1 mm and the thickness of 12.7 mm, 12.0 mm and 7.8 mm, respectively. In a skid line using the conventional conveying method with the aid of free fall, in which impact noises of 110 to 120 phons are produced at a position one meter spaced from the apparatus, measured from one end of the pipe being transported, these noises correspond to a speed of 0.5 m/s to 2 m/s at the time of collision, and the speed must be reduced below 0.2 m/s to suppress the noise to less than 95 phons and to 0.07 to 0.7 m/s to suppress the noise to less than 80 to 85 phons (the upper limit of magnitude of the noises generally tolerable in a typical steel plant) as shown in FIG. 7. The function of the device for preventing the noise in conveying the steel pipe is, therefore, not exhibited if such a low speed cannot be achieved.

Preferred embodiments of the present invention will next be described, referring to FIGS. 8 to 10. In FIG. 8, an AC supply 20 is connected to a DC power source device 24 comprising a rectifier 21 and a thyristor 22. The thyristor 22 has its gate electrode 23 connected to a phase-shifting pulse generator 31. Between the DC supply device 24 and an excitation coil there is connected a contactless DC thyristor switch 30 comprising a second thyristor 25, a third thyristor 26 and a resistor 27 for providing forward and backward currents to the excitation coil 30. The second and third thyristors 25, 26 have their gate electrodes 28, 29 connected to the phase-shifting pulse generator 31, to which a pattern setting generator 32 is connected. A DC output voltage from the DC supply device 24 in FIG. 8 is controlled by the DC thyristor switch 30 to generate an output voltage $V_M$, which is applied to the excitation coil 33. Next, this operation will be described in detail with reference to FIG. 9. The pattern setting generator 32 sets one cycle T (equal to $T_1 + T_2 + T_3 + T_4$) comprising a time $T_1$ during which the excitation coil 33 is forwardly excited by an excitation voltage, a time $T_2$ from the forward excitation of OFF, a time $T_3$ for backward excitation and a time $T_4$ from the backward excitation to OFF, and it also functions as described later. A trigger signal is applied to the gate electrode 23 of the first electrode 22 at a starting moment of the forward excitation time $T_1$ to turn the thyristor on, and simultaneously applied to the gate electrode 28 of the second thyristor 25 to turn it on. This causes the DC rectified voltage $V_D$ to be generated to provide a forward excitation voltage $(V_M)_N$, which is applied to the excitation coil 33. At this time, forward excitation current $(I_M)_N$ flows into the excitation coil 33 through the second thyristor 25. The first and second thyristors 22, 25 are then simultaneously turned off at a time $t_2$ and kept in an OFF state during the time $T_2$. It is necessary to make the set time $T_2$ previously longer than a discharge time $T_4$ during which discharge current flows due to a counter electromotive force produced at a time when the forward excitation current $(I_M)_N$ to the excitation coil 33 is cut off. This requirement is obvious in view of a commutation time of the thyristor 25. A signal from the pattern setting generator 32 causes the first thyristor 22 to be again turned off at a moment $t_2$ and the third thyristor 26 to be turned off at the same time. The DC supply device 24 again produces the DC rectified voltage $V_D$ to apply a backward excitation voltage $(V_M)_R$ to the excitation coil 33 during $T_3$. A resistor 27 is connected in series with the third thyristor 26, so that the backward excitation voltage $(V_M)_R$ is made smaller than the forward excitation voltage $(V_M)_R$. At this time, backward exitation current $(I_M)_R$ flows into the excitation coil 33. At a moment $t_3$, the first thyristor is again turned off and a third thyristor 26 is also simultaneously turned off with both the thyristors kept OFF during $T_4$. Thus, the excitation coil 33 receives the alternate forward and backward excitations with the repeated cycle T.

The fact that the first and second thyristors 23 and 25 turn on or off the first and third thyristors 23 and 26 synchronously, respectively, is most suitable for forward and backward switching operations of a load such as the excitation coil of great inductance. If the second and third thyristors 25, 26 in the thyristor switch 30 are turned on or off with the DC voltage $V_D$ generated, the commutation operation is complicated with the result of the complicated circuit arrangement, increase in number of parts and reduction in reliability, but the present invention allows a simplified circuit arrangement with increased reliability because the DC voltage is made zero to perform the commutation operation.

The feature of the controlling method according to the present invention will next be described, referring to FIGS. 9a to 9c in conjunction with FIGS. 5 and 6. FIG. 5a corresponds to the terminal $T_4$ of the cycle in FIG. 9, and shows a position of the steel pipe 9, which falls free from a previous swing magnetic pole without any excitation and comes near to the swing magnetic pole 10 as the cycle changes to the forward excitation time $T_1$ of the next cycle. The braking energy $E_{el}$ due to the eddy current is generated at the transition from the condition of free fall to the forward excitation. The braking energy $E_{sl}$ due to the mechanical friction and braking energy $E_{al}$ due to the magnetic attraction are then successively produced during the forward excitation time $T_1$ as the steel pipe advances as shown in FIGS. 5b and 5c. In FIG. 5c, the equilibrium of energy shown by the expression (11) is achieved to bring the steel pipe 9 to a temporary stop or to a state approximate to the stop. The forward excitation is then turned off through the time $T_2$ and further changed to the backward excitation through the times $T_3$, $T_4$ as shown in FIG. 9c to remove the steel pipe 9 from the swing device 10 in FIG. 5c for free fall. After that, the movements as shown in FIGS. 5a to 5c are repeated in the next cycle. In other words, the steel pipe 9 is supplied with the forwardly and backwardly repeating excitations by the controlling device a shown in FIG. 8 for every stage of the swing device and thus conveyed pitch by pitch with the repetition of free fall and stop.

Figure 10:
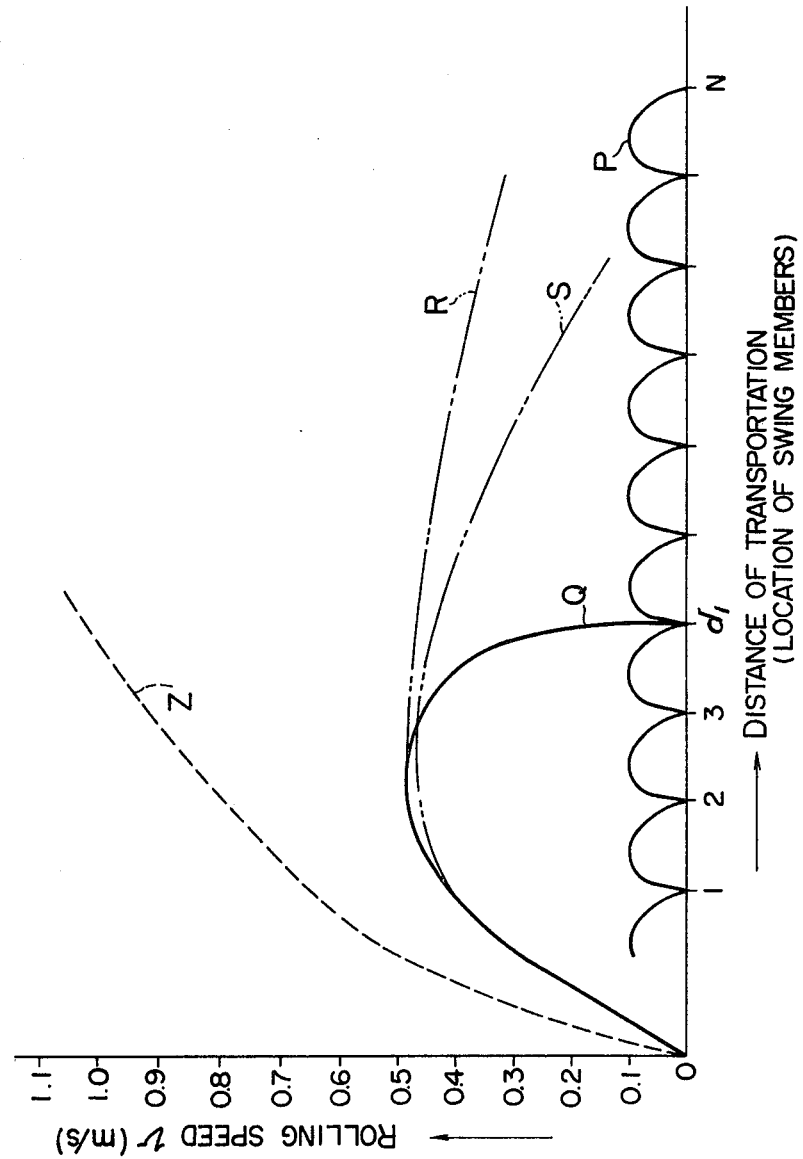
FIG. 10 is a graph showing a relation between the distance from the entrance end on the conveyor and the speed of the article when conveyed on the conveyor.

FIG. 10 shows one example of rolling characteristics of the steel pipe measured according to the present invention with its abscissa indicating the distance of transportation on the conveyer or the location of the swing members and its ordinate indicating the rolling speed V(m/s). A curve Z shows a rolling speed without magnet, i.e., due to the conventional free fall. A curve P illustrates the rolling speed of the steel pipe 9 conveyed in pitches by the forwardly and backwardly switched excitation according to the controlling method of the present invention. It will be understood that this makes it possible to reduce the rolling speed of the steel pipe to less than 1 m/s with the noise of collision reduced remarkably in comparison with the curve Z as is apparent from FIG. 7.

Curves R and S show the rolling characteristics obtained by applying a constant excitation without switching the excitation voltage. In this case, the speed is reduced by the excitation voltage, but is not kept constant relative to the rolling distance d(m) and not permitted to be below 0.2 m/s. When, further, the steel pipes 9 stay on the skid rail 1, the collision speed varies from time to time, so that irregularities of the noise of collision occur and a plurality of controlling devies are needed to eliminate the irregularities. The curve Q is a curve in which the steel pipe is provided with initial energy by a conveying kicker in the pitch-conveying method. In case that the steel pipes do not pause, in any event, before travelling the distance $d_1$, no modification is needed, but a mechanical stopper is provided near to the conveying kicker to absorb the initial energy in a case where the steel pipes 9 may pause over the total length of the skid.

Next, explanation will be made of the operation of swing member with respect to the movement of a steel pipe with reference to FIGS. 11a to 11e.

Figure 11:
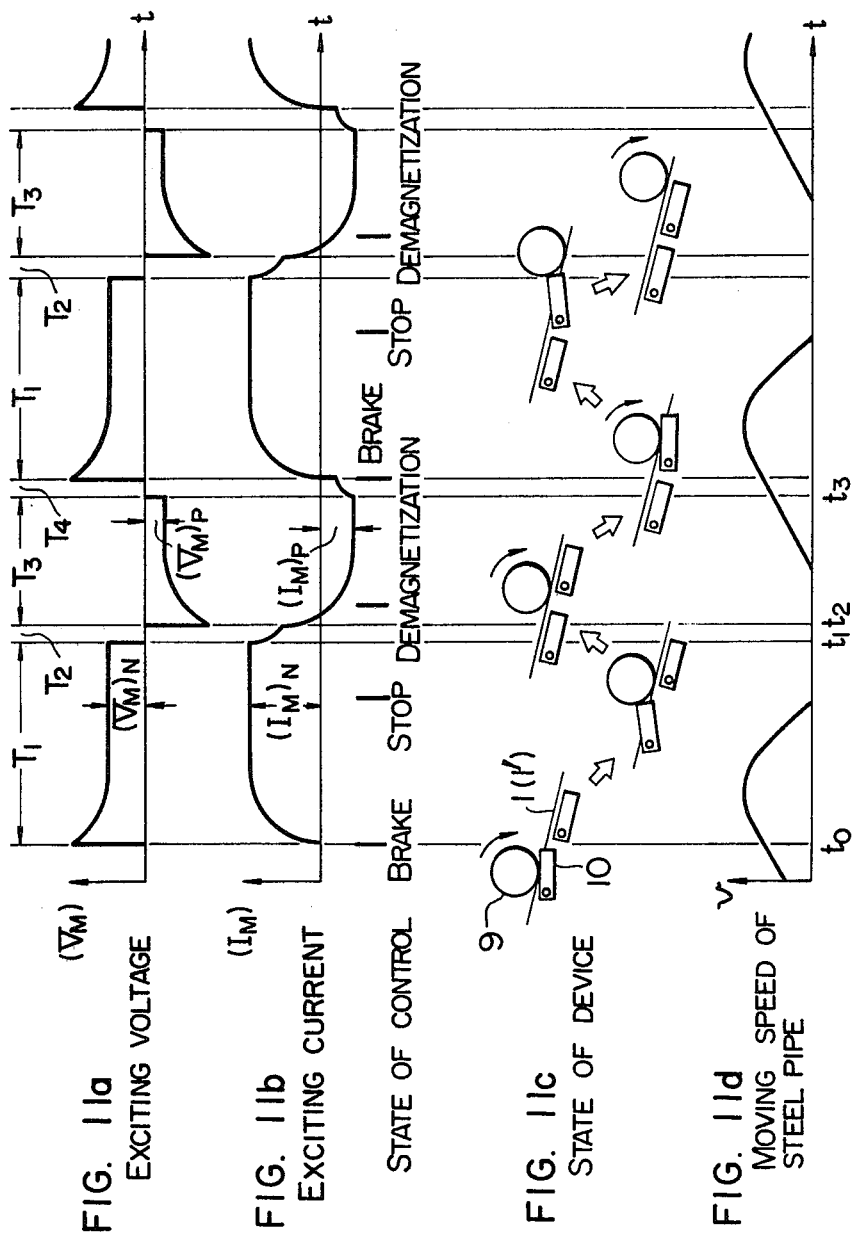
FIGS. 11a, 11b, 11c and 11d are diagrams for illustrating the operation of the swing member with respect to the steel pipe being conveyed.

FIGS. 11a and 11b show variation of the exciting voltage and the exciting current flowing through the magnet coil which assume forward excitation during the period $T_1$ and reverse excitation during the period $T_3$, alternately. The exciting current might take a relatively long time during each excitation cycle before it reaches the normal state $(I_M)_N$ due to the large inductance of the magnet coil. In order to make the delay as small as possible, it is preferred to use a constant current control for the exciting current thereby to cause the exciting current to use in as short a time as possible and to more quickly effect the change from the non-excitation or non-braking state to the braking state. Otherwise, the steel pipe would continue acceleration under the non-braking state for a long time, resulting in the necessity of large braking effort by the magnet coil in order to decelerate and stop the steel pipe. The quick rising of the exciting current is effective to apply to the steel pipe a braking effort before it accelerates greatly and hence effective to make the braking effort required for decelerating and stopping the steel pipe small. Thus, the function of the apparatus is greatly dependent on how quickly the exciting current rises. The exciting voltage for providing the forward excitation expires at $t_1$, that is, the end of the time period $T_1$, but the exciting current continues to flow through a discharging resistor DR, as described hereinafter, due to the inductance of the magnet coil. At $t_2$, the reverse voltage is applied to the magnetic coil for reverse excitation thereof. The time interval from $t_1$ to $t_2$ is provided to avoid failure of commutation, that is, the short circuit of the power source due to simultaneous conduction of the thyristor for forward excitation and the thyristor for reverse excitation. By applying the reverse excitation to the magnet coil, the residual magnetization of the steel pipe and the swing member is forcibly cancelled thereby to assure the removal of the steel pipe from the swing member and to cause the steel pipe to roll down. The reverse excitation current $(I_M)_R$ is set usually at 50% of the forward excitation current $(I_M)_N$. At $t_3$, the exciting voltage for reverse excitation is expired and the exciting voltage for forward excitation is again applied in $T_4$ after expiration of the reverse exciting voltage.

With the above arrangement, the state of control applied to the steel pipe is changed as mentioned. FIG.

11c shows the positional relationship between the swing member 10 and the steel pipe 9 being transported. The steel pipe rolls down under the reverse excitation state and the non-excitation state. According to the initiation of the forward excitation, the steel pipe attracts the swing member thereby to undergo the braking effect and decelerate gradually until it stops at the end of the swing member. It is necessary to continue the forward excitation for a time sufficient to stop the movement of the steel pipe.

Then, the control is changed to start the reverse excitation thereby to cause the magnetic flux to flow in the reverse direction, resulting in the removal of the steel pipe from the swing member thereby to allow the steel pipe to roll down. During the reverse excitation period, the steel pipe undergoes a braking force due to the reverse current through the magnet coil, which, however, is insufficient to prevent the steel pipe from being accelerated for rolling down. The steel pipe thus accelerated under the non-excitation state and the reverse excitation state is again stopped under the next forward excitation. Thus, the steel pipe repeats acceleration for rolling down → braking → deceleration to stop, that is, undergoes the transportation of intermittent mode.

Next, the explanation will be made of typical circuit arrangements of the DC power source device 24, the switch device 30 and the exciting device 33 as shown in FIG. 8 with reference to FIG. 12. In FIG. 12, the DC power source device 24 is shown to include diodes 21a, 21b and 21c and thyristors 22a, 22b and 22c which are connected in a hybrid bridge circuit. The switch device 30 is shown to include thyristors 25a, 25b, 26a and 26b, and resistors 27a and 27b. The exciting device 33 includes the magnet coil 33' and a discharging resistor connected in parallel to the coil 33'.

The material circuit diagrams of the devices which are indicated by mere blocks in FIGS. 8 and 14 are shown in FIGS. 13, 14 and 20 to 22. In these figures, the reference numerals 51, 52, 53a and 56d indicate potentiometer; 78 and 79 indicate operation amplifiers, 82a, 82b and 83a to 83d indicate field effect transistors (FET); 80a, 80b and 81a to 81d indicate amplifiers for driving the FETs; 84a, 84b, 85a, 85b, 86a to 86d and 87a to 87d indicate time delay elements; 89a, 89b and 90 indicate NAND gate; 103 a comparator; 104a and 105a indicate pulse transformers; 106a indicate a buffer amplifiers; 109a to 109e and 110a to 110c indicate key switches; 112a to 112d indicate relay coils for operating relay contacts $112a(a_1 - a_3)$ to $112d(a_1 - a_3)$, respectively, and 113 indicate a matrix circuit.

In FIG. 13 which shows a typical circuit diagram of the pattern generator 32, a multivibrator including flip-flop circuit 88, time delay elements 84a and 84b are provided to generate a rectangular wave having a wave length $T_1$ and a rectanguler wave having a wave length $T_3$ periodically. These rectangular waves are applied with time intervals $T_2$ and $T_4$ determined by the time delay elements 85a and 85b to a flip-flop circuit including NAND gates 89a and 89b, which inverts the polarity of the waves to produce excitation signals for forward and reverse excitations.

The amplitude of the exciting current is determined by a potentiometer 51, whose output voltage is applied through operation amplifier 78, operating resistors 55 and 56 to a potentiometer 52 which determines the ratio between the forward and reverse excitations. The excitation signals produced by the NAND gates 89a and 89b are applied through amplifiers 80a and 80b to the gates of field effect transistors (FETs) 82a and 82b, respectively, thereby to produce pattern signals for forward and reverse excitations, alternately. The pattern signals are applied through an operation amplifier 79, to the pulse-phase shifter 31.

As shown in FIG. 14 the pulse-phase shifter 31 includes three similar units 31a, 31b, 31c which function in the same manner. An AC voltage of the power source 20 is applied to a transistor 101a which assumes ON and OFF states, alternately, in synchronism with the frequency of the AC power. During the OFF state, a capacitor 98a is charged by a DC power source $P_{15}$ through a resistor 63a and, during the ON state, discharged through a resistor 61a, thereby to periodically produce a rectangular wave at the frequency of the AC power source. The rectangular wave is added to the pattern signal through diode 92a and resistor 62a thereby to produce a rectangular wave including a DC component. A comparator 103a is used to compare the rectangular wave including the DC component with a predetermined reference voltage determined by resistors 69 and 70 thereby to be produced a rectangular wave signal which is shifted in phase according to the pattern signal. The rectangular wave signal is applied to a transistor 102a through a differentiating circuit including capacitor 99a and resistor 67a, to produce a phase-shifted pulse signal, which in turn is applied to a pulse transformer 104a. The output of the transformer 104a is applied to the gate of a thyristor 22a for controlling the conduction of the thyristor according to the phase-shifted pulse signal.

The pulse shifter units 31b and 31c function in the same manner as the unit 31a. However, the AC voltages applied to the three units are different in phase by an electrical angle of 120° from each other, the units 31a, 31b and 31c actuates according to the three phases of the AC power source to drive the thyristors 22a, 22b and 22c as shown in FIG. 12.

A resistor 66a is used to cancel the input voltage applied to the transistor 101a thereby to suppress the actuation of the unit 31a. That is, the outputs from the NAND gates 89a and 89b in FIG. 13 are applied to a NAND gate 90 for producing a suppression signal which includes pulses corresponding to the time intervals $T_2$ and $T_4$. Therefore, the thyristors 22a to 22c, 25a, 25b, 26a and 26b are held OFF state during the time intervals.

As described above, the present invention makes it possible to reduce the speed of the steel pipe to zero or to about zero for every stage of the swing device and to convey the successively arriving steel pipes 9 pitch by pitch according to the distance of the swing member 10 with the conveyance at a low speed achieved and with the noises of collision of the steel pipes remarkably reduced.

The description has been made of one embodiment of the present invention in which the forward and backward excitations are alternately repeated, but the objects of the present invention will be achieved by suitably selecting the inclination of the skid rail and making variable the amount of excitation applied to the excitation coil for on-off controls only with a so-called forward excitation. In this case, it is to be noted that the excitation must be controlled with high precision.

Further, various different modes of the excitation pattern may be used depending on the size and/or the type of the articles to be transported. Such modes include a mode in which the forward excitation is changed depending on the size of the article while the reverse excitation is held constant, and another mode in which the forward and reverse excitations are both changed depending on the size of the article.

In the embodiment of the present invention, it is assumed that the swing members (magnetic poles) are provided. An apparatus for conveying steel pipes, even if not provided with any swing device, can successfully employ the transportation of the intermittent mode using the repeated forward and backward excitations because it can save the excitation power and stop the steel pipe at a plurality of positions on the skid rail.

Alternatively, a plurality of excitation coils are selectively excited to make the interval in the intermittent mode variable in conveying the steel pipe pitch by pitch in order to provide an optimum pitch corresponding to the size of the steel pipe or to the number of steel pipes remaining on the skid rails.

Generally, it is very seldom for any steel pipe conveying line to always treat only steel pipes of a specific size, but the sizes of steel pipes treated on one line widely range, for example, 10 to 180 mm in diameter for pipes of small diameter and about 200 to 500 mm in diameter for pipes of middle diameter. For this reason, the manual adjustment of the excitation according to the size of the steel pipe not only makes operations complicated but provides no noise prevention effect because of adjustment errors. In another embodiment of the present invention, an optimum controlling pattern is previously set for every size of the steel pipe to be set for a size when it is changed. Thus, a control pattern suitable for the size of the steel pipe is automatically selected.

An experiment shows that there is a relationship as shown in FIG. 15 between the unit weight of steel pipe and forward excitation current. This shows a condition for providing an optimum transportation interval with the increase in unit weight resulting in great excitation current. When an excitation current Ia which is optimum for a steel pipe having the unit weight of 10 kg/m was used for conveying steel pipes of other sizes, the steel pipes were transported in a pitch mode of which the interval of each pitch was several times as great as the pitch of the swing members as shown in FIG. 16. This causes a maximum speed in transportation to be made great, so that no desired reduction in noise of collision can be achieved.

The time intervals $T_1$, $T_2$, $T_3$, $T_4$ also depend upon the size of the steel pipe as shown in FIGS. 17a to 17d in which A and C represent different diameters of the steel pipe and $a$ and $c$ represent different thickness thereof. Thus, the excitation pattern is determined depending on the size of the steel pipe so as to provide the best mode of transportation.

It is too complicated to manually set the excitation pattern or excitation current for every change in size of the steel pipe, so that a key board 35 and an excitation pattern setting device 34 are additionally connected in the above-mentioned circuit in FIG. 8 to provide a circuit as shown in FIG. 18.

Referring to FIG. 19, the key board 35 is provided on the columns of its surface with push button switches arranged according to the outer diameter of the steel pipe and on its rows with other push button switches arranged according to the thickness of the steel pipe. When, for example, a steel pipe having an outer diameter $C^\phi$ and a thickness of $a$ mm is to be treated, a push button switch No. 7 is pushed to transmit instructions of excitation patterns $T_1$, $T_2$, $T_3$ and $T_4$ of an amplitude E optimum to the size of the steel pipe from the excitation pattern setting device 33 to the pulse generator 32 and to generate the optimum excitation pattern.

The pulse generator 40 shown in FIG. 18 will be explained with reference to FIG. 20. The rectangular wave signal produced from the time delay element 85a for the forward excitation is applied to a differentiating circuit including capacitor 100a and resistor 71 to produce a pulse at the leading edge of the rectangular wave. The pulse is applied through an amplifier 106a to a pulse transformer 105a thereby to produce pulses at the secondary windings to be applied to the gates of the thyristors 25a and 25b, respectively.

In the same manner, the rectangular wave signal produced from the time delay element 85b for the reverse excitation is applied to the pulse generator unit 40b to produce at the leading edge of the rectangular wave pulses to be applied to the thyristors 26a and 26b for controlling the conduction of the same.

The key board 35 may be constructed as shown in FIG. 21. Diodes 107 and 108 are of the pin type adapted to change their location in the matrix circuit 113. By suitably selecting the location of the pin diodes, it is possible to select the optimum excitation pattern according to the diameter and thickness of the steel pipe. If one of the key switches 109a to 109e for setting the diameter, for example, the key switch 109a and one of the key switches 110a to 110c for setting the thickness, for example, the key switch 110a are turned on, a source current flows from the power terminal P48 to a common terminal COM through operation resistors 74a and 75a, thereby to make the input of the relay driver 111a zero potential of the common terminal. If one of the key switches 109a and 110a is turned OFF, the pin diodes 107 and 108 prevent the current flow to the turned off switch, the input of the driver 111a is held at a DC positive voltage. Thus, only when the key switches 109a and 110a are both turned on, the relay driver 111a is rendered ON thereby to actuate the relay 112a. By changing the location of the pin diodes, it is possible to selectively actuate the relay 112b, 112c or 112d.

The pulse generator 32 and excitation pattern setting device 34 are constructed as shown in FIG. 22. If the relay 112a in FIG. 21 actuates as above-mentioned, the relay contacts $112a(a_1 - a_3)$ in FIG. 22 are closed to apply a gate signal to the FET 83a through the gate driving amplifier 81a, whereby the operation amplifier 78 is supplied with a pattern voltage corresponding to the voltage being set by the potentiometer 53a through the operation resistor 79a. In the same manner, the pattern voltages set by the potentiometers 53b, 53c and 53d are selectively used for being applied to the amplifier 78. The pattern generator 32 functions in the same manner as mentioned hereinbefore.

The time delay elements 96a to 86d and 87a to 87d are connected through corresponding relay contacts to the flip-flop 88 and hence the flip-flop 88 operates in timing according to the selected time delay elements thereby to produce a selected pattern signal for excitation.

As described above, in the present invention, the instructions concerning the diameter and thickness of the steel pipe are given to bring the steel pipe to a complete or approximate stop at every stage of the swing device and to convey the successively coming steel pipes in the pitch mode according to the distance between the swing members 10, resulting in a low transportation speed for each steel pipe and greatly reduced noise of collision between the steel pipes. In this embodiment, means for generating the magnetic field has been exemplified as an excitation coil but may be realized by a permanent magnet. It is further possible to vary an air gap to change the intensity of the magnetic field and to control the forward and backward excitations in combination with a plurality of magnets.

What we claim is:

1. An apparatus for transporting cylindrical steel articles comprising:
    transporting means including a plurality of skid rails extending from an entrance end to an exit end of said transporting means in parallel with each other and spaced from one another and inclined for transporting thereon cylindrical articles,
    means for providing a magnetic circuit which passes through at least a part of the article being transported,
    exciting means for producing magnetic flux through said magnetic circuit,
    control means for applying to said exciting means forward and reverse excitations, alternately, with a predetermined relationship in timing, and
    a swing device including a plurality of swing members each made of magnetizable material and extending in parallel with said skid rails, each of said swing members being supported pivotably at one end for pivotal movement thereby to be allowed to cause the pivotal movement as magnetically attracted by the article being transported.

2. An apparatus according to claim 1, wherein said control means comprises means for setting a plurality of predetermined excitation patterns according to different sizes of the articles to be possibly transported and means for selecting one of said patterns depending on the size of the article to be actually transported.

3. An apparatus according to claim 1, wherein said control means comprises first switching means for supplying the forward excitation, second switching means for supplying the reverse excitation, and means for switching said first and second switching means, alternately, in the predetermined relationship in timing.

4. An apparatus according to claim 1, wherein the magnetic flux produce by said forward excitation is larger than that produced by said reverse excitations.

5. An apparatus according to claim 1, wherein the magnetic flux produced by said forward excitation is changeable depending on the size of the article to be transported.

6. An apparatus for transporting cylindrical steel articles from an entrance end to an exit end comprising:
    skid means including a plurality of skid rails extending in parallel from said entrance end to said exit end and inclined for transporting cylindrical steel articles towards said exit end by free rolling down said inclined skid rails;
    means for providing a plurality of magnetic circuits along the downward rolling path of said articles on said skid means;
    exciting means for producing magnetic flux through each of said magnetic circuits sufficient to reduce the rolling speed of the article when the articles come into the proximity of each of said magnetic circuits;
    control means for controlling said exciting means to periodically produce said magnetic flux through each of said magnetic circuits at a predetermined timing so that the article is subjected to repeated cycles of free rolling and reduction of rolling speed when the article passes said magnetic circuits, successively, along its downwardly rolling path; and
    a swing device including a plurality of swing members each made of magnetizable material and extending in parallel with said skid rails, each of said swing members being supported pivotably at one end for pivotal movement thereby to be allowed to cause the pivotal movement as said swing members are magnetically attracted by the article being transported.

7. An apparatus according to claim 6, wherein said control means controls said exciting means for transporting the cylindrical steel articles towards said exit end in a pitch transportation mode along the rolling path of the articles.

8. An apparatus according to claim 6, wherein said control means comprises means for setting a plurality of predetermined excitation patterns according to different sizes of the articles to be possibly transported, and means for selecting one of said patterns depending on the size of the article to be actually transported.

9. An apparatus according to claim 6, wherein said control means comprises means for applying to each of said magnetic circuits, alternately, at a predetermined timing, forward excitation which produces magnetic flux therethrough sufficient to reduce the downwardly rolling speed of the article when the article comes into the proximity of each of said magnetic circuits and reverse excitation which substantially cancels residual magnetic flux remaining in each of said magnetic circuits after expiration of said forward excitation.

10. An apparatus according to claim 9, wherein said reverse excitation is approximately 50% in intensity of said forward excitation.

11. An apparatus according to claim 6, wherein said magnetic flux produced by said forward excitation is variable in dependence on the size of the article to be transported.

* * * * *